(12) United States Patent
Ross et al.

(10) Patent No.: US 6,375,215 B1
(45) Date of Patent: *Apr. 23, 2002

(54) AIRBAG HOUSING AND COVER

(75) Inventors: Hubert Rene Ross, Oberursel; Andreas Staub, Sulzbach AM; Frank Sauberlich, Wiesbaden; Matthias Volkmann, Kronberg/TS; Dirk Roosen, Russelsheim, all of (DE)

(73) Assignee: Breed Automotive Technology, Inc., Lakeland, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,564
(22) PCT Filed: Mar. 13, 1998
(86) PCT No.: PCT/GB98/00766
§ 371 Date: Aug. 16, 1999
§ 102(e) Date: Aug. 16, 1999
(87) PCT Pub. No.: WO98/42546
PCT Pub. Date: Oct. 1, 1998

(30) Foreign Application Priority Data

Mar. 21, 1997 (GB) ............................................. 9705882

(51) Int. Cl.⁷ ............................................. B60R 21/20
(52) U.S. Cl. .................................. 280/728.3; 280/728.2
(58) Field of Search ........................... 280/728.1, 728.2, 280/728.3, 731, 732, 730.2

(56) References Cited

U.S. PATENT DOCUMENTS

| 5,062,664 | A | * | 11/1991 | Bishop et al. | ........... 280/728.2 |
| 5,121,941 | A | * | 6/1992 | Mihm et al. | ................. 280/732 |
| 5,286,054 | A | | 2/1994 | Cuevas | |
| 5,511,818 | A | | 4/1996 | Jarboe et al. | |
| 5,527,062 | A | * | 6/1996 | Kreuzer | .................... 280/728.1 |
| 5,690,354 | A | * | 11/1997 | Logan et al. | ............. 280/728.3 |

FOREIGN PATENT DOCUMENTS

| GB | 2 270 045 | 3/1994 |

* cited by examiner

*Primary Examiner*—Eric Culbreth
(74) *Attorney, Agent, or Firm*—Markell Seitzman

(57) ABSTRACT

An airbag arrangement comprising: an airbag; a housing (1), formed of plastics material, for containing the airbag in a deflated, folded condition; a cover (5), formed of flexible material, and attached to the airbag housing (1) by a seal around a substantial portion of the periphery of the housing (1). The seal may be by heat or pressure sensitive glue, by ultrasonic or vibration welding or by deformable lugs (9). This arrangement is cheaper to produce and quicker to assemble, and has the advantage of being generally tamper-proof, since any tampering with the package will be immediately evident from detachment of the cover or tears therein.

8 Claims, 3 Drawing Sheets

DETAIL A

DETAIL B

AIRBAG HOUSING AND COVER

The present invention relates to a housing and cover for an airbag for a vehicle safety restraint.

Traditionally a safety restraint airbag is contained in its uninflated state in a metal housing mounted to a fixed part of the vehicle such as the steering wheel (driver side airbags) or the instrument panel (passenger side). The folded airbag is protected from the ingress of dirt or dust by a dust cover. When the airbag deploys in a crash situation, the dust cover splits and a door in the instrument panel or steering wheel either detaches, or splits open quickly, and without forming debris which could form dangerous projectiles and injure the vehicle occupant.

Commonly the dust cover is formed of a thin, flexible material such as non-woven fabric or a woven polyamide or polyester or polyethylene material and the door is made of rigid material.

According to the present invention there is provided an airbag arrangement comprising an airbag;

a housing, formed of plastics material, for containing the airbag in a deflated, folded condition;

a dust cover, formed of thin and flexible material, and attached to the airbag housing by a seal around a substantial portion of the top edge periphery of the housing, wherein the thin and flexible material forming the cover is sealed to the housing by ultrasonic welding overprinted with warning messages and/or with information texts and/or with bar codes and/or with trade mark material.

This arrangement is cheaper to produce and quicker to assemble, and has the advantage of being generally tamperproof, since any tampering with the package will be immediately evident from detachment of the cover or tears therein.

For a better understanding of the present invention and to show how the same may be carried into effect, reference will now be made to the accompanying drawings which are given by way of example:

Figure 1:
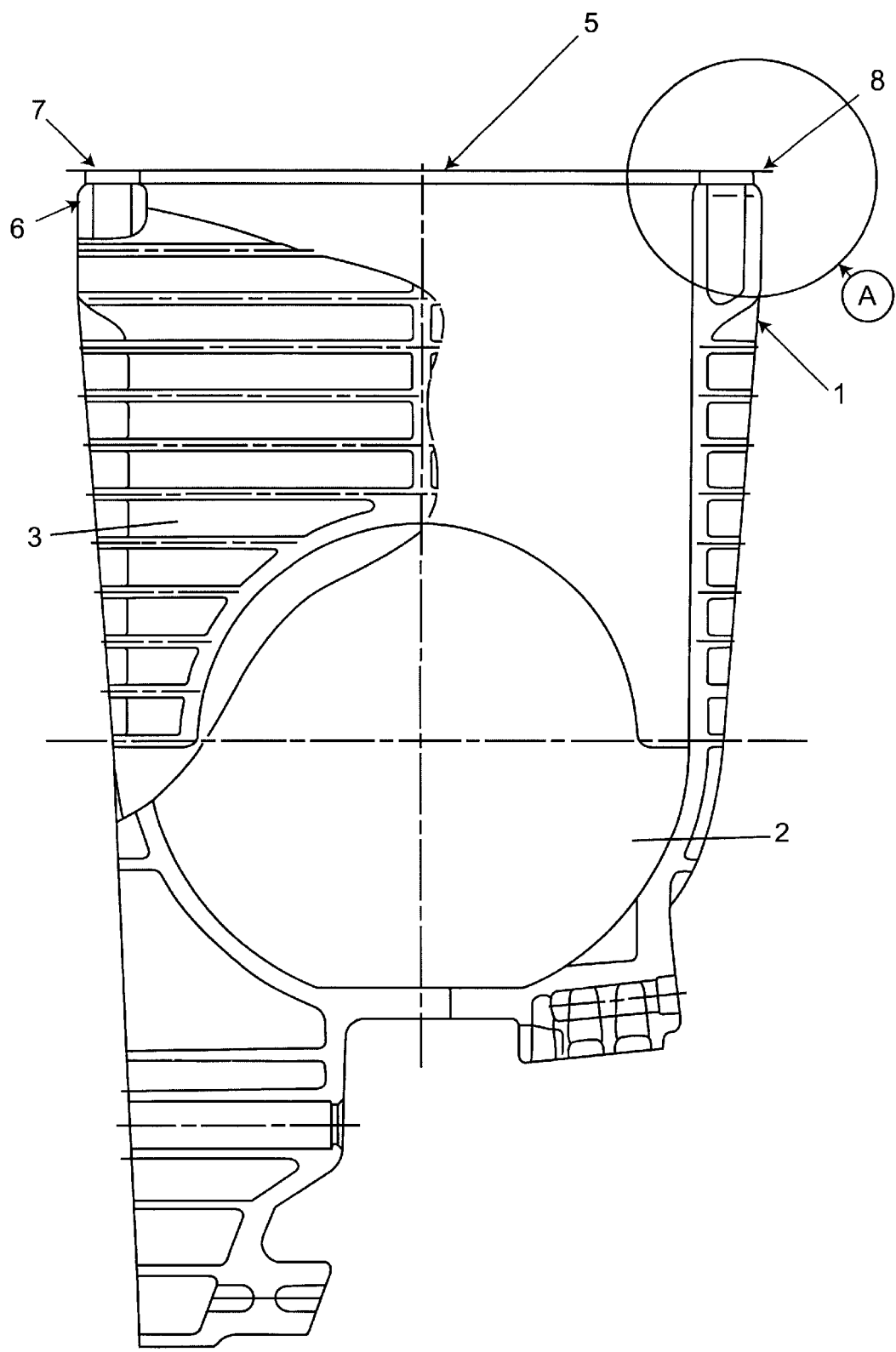
FIG. 1 illustrates a first embodiment of the present invention.

In FIG. 1 an airbag housing 1 is formed of plastics material. It forms a container for an airbag inflator 2 (which may be a gas cylinder or a pyrotechnic type inflator well known to persons skilled in the art). An uninflated airbag cushion 3 is folded on top of the inflator 2.

A duct cover 5 is welded around a substantial part of the top 8 of the peripheral flange 6 of the air bag housing 1 as indicated at 7.

The dust cover 5 may additionally be attached to the plastics airbag housing 1 by heat treatment or along at least a substantial part of the peripheral line at which it contacts the housing flange 6.

Figure 2:
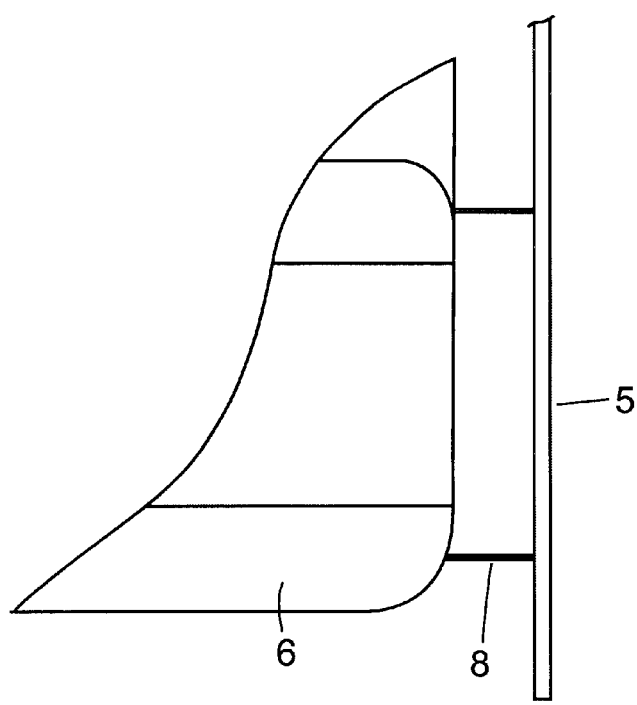
FIG. 2 is an enlarged view of part A of FIG. 1.

FIG. 2 illustrates in more detail the lines 8 along which the heat treatment or welding is applied.

Figure 4:
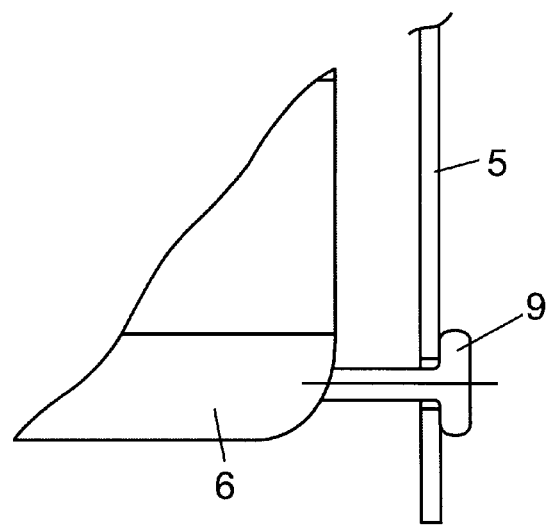
FIG. 4 is an enlarged view of part B of FIG. 3.
Figure 3:
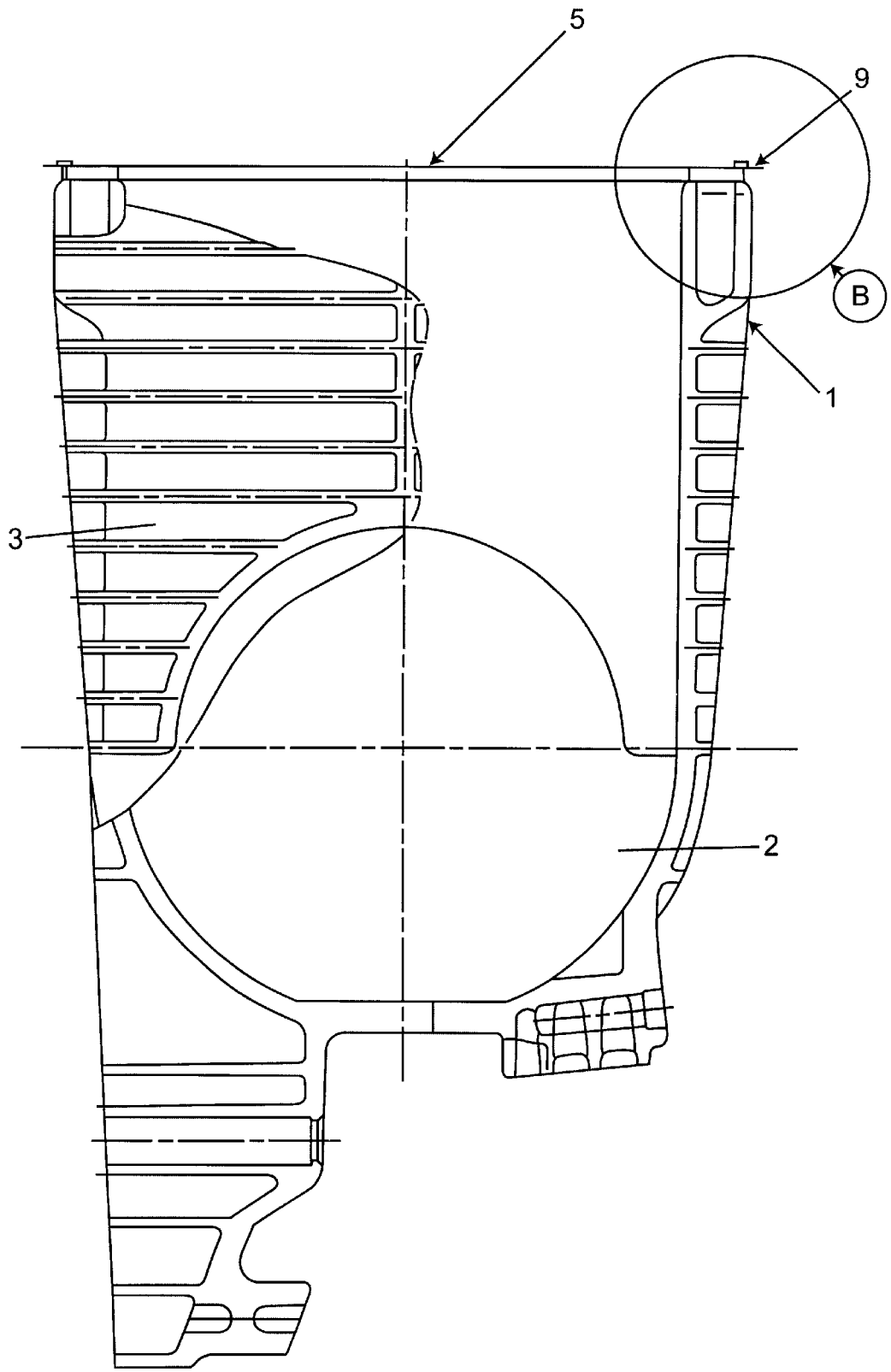
FIG. 3 illustrates a second embodiment of the present invention.

In FIG. 3 heat formed joining lugs 9 are formed as upstanding pintype features on the housing 1. These lugs are formed as simple stalks as shown in FIG. 4, and are pushed through holes around the periphery of the cover and locally heat treated to form heads 9 as shown in FIG. 3, and to retain the cover. Ultrasonic treatment could also be used.

What is claimed is:

1. An airbag arrangement comprising an airbag;

a generally rigid housing, having an open mouth and a top edge about the mouth, formed of plastics material, for containing the airbag in a deflated, folded condition;

a dust cover, formed of flexible material, the material being substantially thinner than the housing, and attached directly to the airbag housing by a seal around a substantial portion of the top edge, wherein the material forming the cover is sealed to the housing by ultrasonic welding and wherein the cover is overprinted with at least one of: warning messages and information tests and bar codes and with trademark material.

2. The airbag arrangement according to claim 1 wherein the dust cover is directly attached to the top edge of the housing.

3. The airbag arrangement according to claim 1 wherein the housing includes a peripheral flange and wherein the dust cover is directly secured to the flange.

4. An airbag arrangement according to claim 1, further comprising deformable pin members formed integrally with the air bag housing.

5. An air bag arrangement according to claim 4, wherein the deformable pin members comprise joining lugs (9) formed as an upstanding stalk around the periphery of the housing (1) and holes are provided around the periphery of the cover to receive the lugs (9).

6. An airbag arrangement according to claim 5, wherein the lugs (9) are one of subsequently locally heat and ultrasonically treated to form heads to retain the cover.

7. An airbag arrangement comprising an airbag;

a generally rigid housing, having an open mouth and a top edge about the mouth, formed of plastics material, for containing the airbag in a deflated, folded condition;

a warning message over printed on a dust cover, the dust cover formed of flexible material, the material being substantially thinner than the housing, and attached to the airbag housing solely by a seal around a substantial portion of the top edge, wherein the material forming the cover is sealed to the housing by ultrasonic welding.

8. An airbag arrangement comprising:

an airbag;

a rigid housing, having an open mouth and a top edge and flange about the mouth, formed of plastics material, for containing the airbag in a deflated, folded condition;

a dust cover, formed of flexible material, the material being substantially thinner than the housing, and attached directly to the flange of the airbag housing by ultrasonic welding.

* * * * *